United States Patent
Ice et al.

(10) Patent No.: US 6,840,672 B2
(45) Date of Patent: *Jan. 11, 2005

(54) TOTAL AIR TEMPERATURE PROBE PROVIDING IMPROVED ANTI-ICING PERFORMANCE AND REDUCED DEICING HEATER ERROR

(75) Inventors: Paul A. Ice, Apple Valley, MN (US); Charles R. Willcox, Eden Prairie, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 10/601,760

(22) Filed: Jun. 23, 2003

(65) Prior Publication Data

US 2004/0037348 A1 Feb. 26, 2004

Related U.S. Application Data

(63) Continuation-in-part of application No. 09/960,594, filed on Sep. 21, 2001, now Pat. No. 6,609,825.

(51) Int. Cl.[7] .......................... G01K 13/02; G01K 1/16; G01K 1/18
(52) U.S. Cl. .................. 374/139; 374/135; 374/148
(58) Field of Search ................................ 374/138, 148, 374/135; 73/861.68, 861.66, 861.65, 182, 180

(56) References Cited

U.S. PATENT DOCUMENTS

| | | | |
|---|---|---|---|
| 2,970,475 A | 2/1961 | Werner | 73/339 |
| 3,167,960 A | 2/1965 | Miesiak | 374/138 |
| 3,368,406 A | 2/1968 | Himebaugh | 374/138 |
| 3,512,414 A | 5/1970 | Rees | 374/138 |

(List continued on next page.)

FOREIGN PATENT DOCUMENTS

| | | |
|---|---|---|
| FR | 2 808 874 | 5/2000 |
| WO | WO 94/02814 | 2/1994 |
| WO | WO 01/44821 A1 | 6/2001 |

OTHER PUBLICATIONS

Truman M. Stickney, Marvin W. Shedlov and Donald I. Thompson, "Total Temperature Sensors, Technical Report 5755, Revision C", Rosemount Aerospace/BFGoodrich, Jan. 1994.

Primary Examiner—Diego Gutierrez
Assistant Examiner—Mirellys Jagan
(74) Attorney, Agent, or Firm—Westman, Champlin & Kelly, P.A.

(57) ABSTRACT

A total air temperature (TAT) probe for measuring TAT includes an inlet scoop which receives airflow from free stream airflow moving toward the inlet scoop from a first direction. A first portion of the airflow entering the inlet scoop exits the probe through a main exit channel. A second portion of the airflow enters a TAT sensor flow passage, which extends longitudinally along an axis. This axis is oriented to form an angle of less than 90 degrees with the first direction from which the free stream airflow moves toward the inlet scoop. A sensor assembly extends longitudinally in the sensor flow passage and measures a total air temperature of airflow through the sensor flow passage. By increasing the angle through which the internal air turns, better inertial extraction of ice and water particles is realized. As a result, sensor clogging from accreted ice is significantly reduced. A second improvement is achieved by repositioning the sensor element to be more in-line with the internal airflow direction. This helps lower DHE by minimizing heated boundary layer spillage onto the sensing element.

12 Claims, 7 Drawing Sheets

U.S. PATENT DOCUMENTS

| | | | |
|---|---|---|---|
| 4,036,054 A | 7/1977 | Goulet | 73/861.66 |
| 4,047,379 A | 9/1977 | Brookes et al. | 374/135 |
| 4,206,645 A | 6/1980 | Orcutt | 374/138 |
| 4,403,872 A * | 9/1983 | DeLeo | 374/138 |
| 4,458,137 A | 7/1984 | Kirkpatrick | 219/201 |
| 4,821,566 A * | 4/1989 | Johnston et al. | 374/138 |
| 5,302,026 A | 4/1994 | Phillips | 374/135 |
| 5,466,067 A | 11/1995 | Hagen et al. | 374/138 |
| 5,628,565 A | 5/1997 | Hagen et al. | 374/143 |
| 5,731,507 A | 3/1998 | Hagen et al. | 73/861.68 |
| 6,070,475 A | 6/2000 | Muehlhauser et al. | 73/861.68 |
| 6,076,963 A | 6/2000 | Menzies et al. | 374/138 |
| 6,622,556 B1 * | 9/2003 | May | 374/135 |
| 6,651,515 B2 * | 11/2003 | Bernard | 73/861.65 |

* cited by examiner

FIG. 3A *(PRIOR ART)*

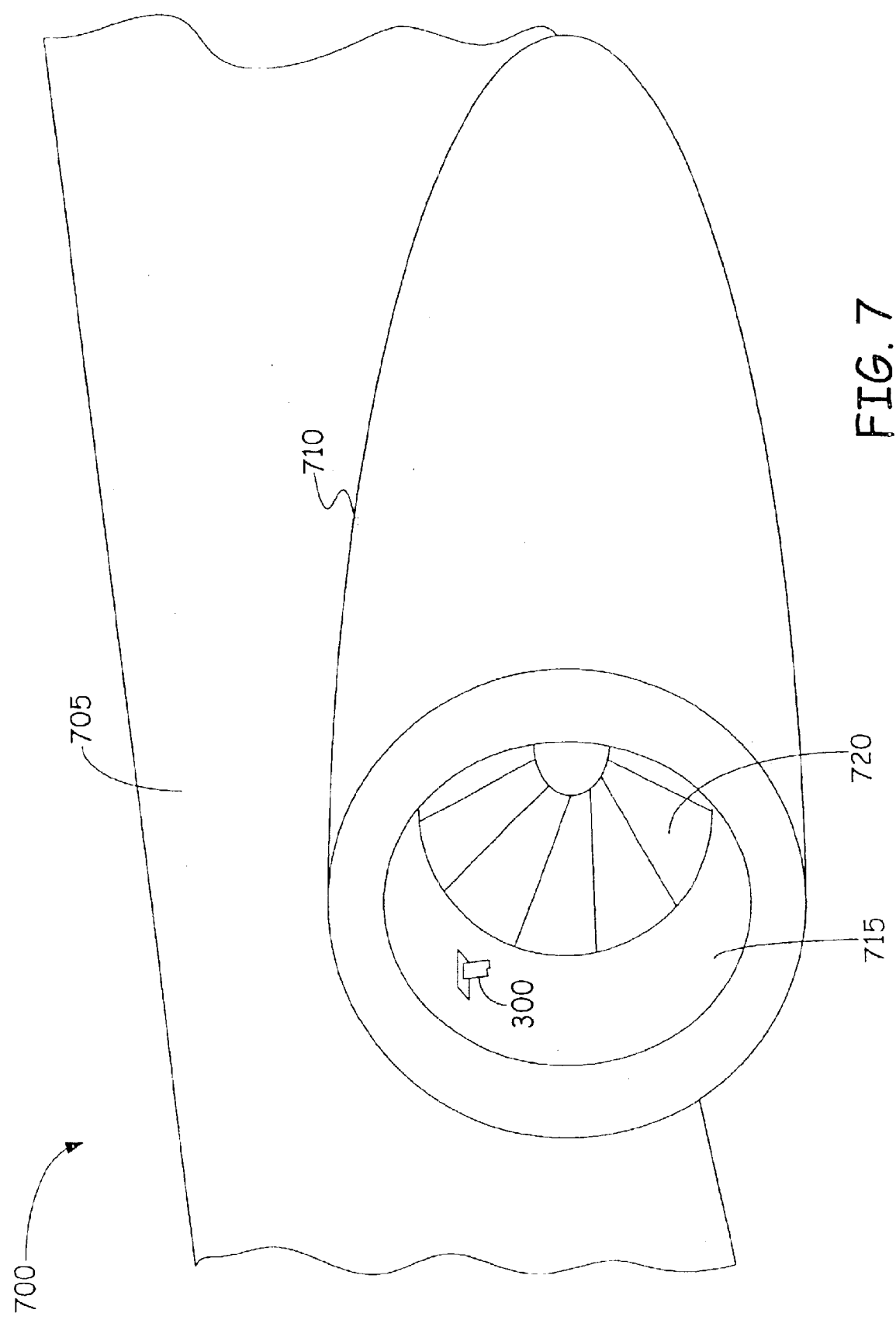

TOTAL AIR TEMPERATURE PROBE PROVIDING IMPROVED ANTI-ICING PERFORMANCE AND REDUCED DEICING HEATER ERROR

The present application is a continuation-in-part of U.S. patent application Ser. No. 09/960,594, filed Sep. 21, 2001, now U.S. Pat. No. 6,609,825 the content of which is hereby incorporated by reference in its entirety.

BACKGROUND OF THE INVENTION

The present invention relates to total air temperature (TAT) probes or sensors. More particularly, the present invention relates to improving anti-icing performance and reducing deicing heater error (DHE) in TAT probes.

Modern jet powered aircraft require very accurate measurement of outside air temperature (OAT) for inputs to the air data computer, engine thrust management computer, and other airborne systems. For these aircraft types, their associated flight conditions, and the use of total air temperature probes in general, air temperature is better defined by the following four temperatures: (1) Static air temperature (SAT) or ($T_S$), (2) Total air temperature (TAT) or ($T_t$), (3) recovery temperature ($T_r$), and (4) measured temperature ($T_m$). (1) Static air temperature (SAT) or ($T_S$) is the temperature of the undisturbed air through which the aircraft is about to fly. (2) Total air temperature (TAT) or ($T_t$) is the maximum air temperature that can be attained by 100% conversion of the kinetic energy of the flight. The measurement of TAT is derived from (3) the recovery temperature ($T_r$), which is the adiabatic value of local air temperature on each portion of the aircraft surface due to incomplete recovery of the kinetic energy. Temperature ($T_r$) is in turn obtained from (4) measured temperature ($T_m$), which is the actual temperature as measured, and which differs from recovery temperature because of heat transfer effects due to imposed environments. For measuring the TAT, TAT probes are well known in the art.

Conventional TAT probes, although often remarkably efficient as a TAT sensor, sometimes face the difficulty of working in icing conditions. During flight in icing conditions, water droplets, and/or ice crystals, are ingested into the TAT probe where, under moderate to severe conditions, they can accrete around the opening of the internal sensing element. An ice ridge can grow and eventually break free—clogging the sensor temporarily and causing an error in the TAT reading. To address this problem, conventional TAT probes have incorporated an elbow, or bend, to inertially separate these particles from the airflow before they reach the sensing element. These conventional TAT probe designs can be very effective at extracting particles having diameters of 5 microns or greater. However, the process of particle extraction becomes increasing less efficient in many conventional TAT probe designs when removing particles below this size.

Another phenomena which presents difficulties to some conventional TAT probe designs has to do with the problem of boundary layer separation, or "spillage", at low mass flows. Flow separation creates two problems for the accurate measurement of TAT. The first has to do with turbulence and the creation of irrecoverable losses that reduce the measured value of TAT. The second is tied to the necessity of having to heat the probe in order to prevent ice formation during icing conditions. Anti-icing performance is facilitated by heater elements embedded in the housing walls. Unfortunately, external heating also heats the internal boundary layers of air which, if not properly controlled, provide an extraneous heat source in the measurement of TAT. This type of error, commonly referred to as DHE (Deicing Heater Error), is difficult to correct for. In conventional TAT probes, the inertial flow separation bend described above has vent, or bleed, holes distributed along its inner surface. The holes are vented to a pressure equal to roughly that of the static atmospheric pressure outside of the TAT probe. In this manner, a favorable pressure difference is created which removes a portion of the boundary layer through the bleed holes, and pins the remaining boundary layer against the elbow's inner wall.

In certain situations, the differential pressure across the bleed holes can drop to zero due to the higher flow velocity along the elbow's inner radius. This stagnation of flow through the bleed holes creates a loss in boundary layer control. The resulting perturbation, if large enough, can cause the boundary layer to separate from the inner surface and make contact with the sensing element. Because the housing walls are heated, so is the boundary layer. Hence, any contamination of the main airflow by the heated boundary layer will result in a corresponding error in the TAT measurement. In general, it is difficult to prevent the stagnation of some of the bleed holes. Thus, DHE is difficult to prevent or reduce.

SUMMARY OF THE INVENTION

A total air temperature (TAT) probe includes an inlet scoop which receives airflow from free stream airflow moving toward the inlet scoop from a first direction. A first portion of the airflow entering the inlet scoop exits the probe through a main exit channel. A second portion of the airflow enters a TAT sensor flow passage, which extends longitudinally along an axis. This axis is oriented to form an angle of less than 90 degrees with the first direction from which the free stream airflow moves toward the inlet scoop. A sensor assembly extends longitudinally in the sensor flow passage and measures a TAT of the airflow through the sensor flow passage. By increasing the angle through which the internal air turns, better inertial extraction of ice and water particles is realized. As a result, sensor clogging from accreted ice is significantly reduced.

A second improvement is achieved by repositioning the sensor element to be more in-line with the internal airflow direction. This helps lower (Deicing Heater Error) DHE by minimizing heated boundary layer spillage onto the sensing element.

BRIEF DESCRIPTION OF THE DRAWINGS

FIGS. 3A and 3B are diagrammatic illustrations of a prior art TAT probe and a TAT probe in accordance with the invention, respectively, which illustrate an angle θ between a direction of travel of free stream airflow into the TAT probe and an axis of the sensor flow passage.

FIG. 7 is a diagrammatic perspective view of a TAT probe of the present invention mounted to an aircraft engine.

DETAILED DESCRIPTION OF THE PREFERRED EMBODIMENTS

Figure 1:
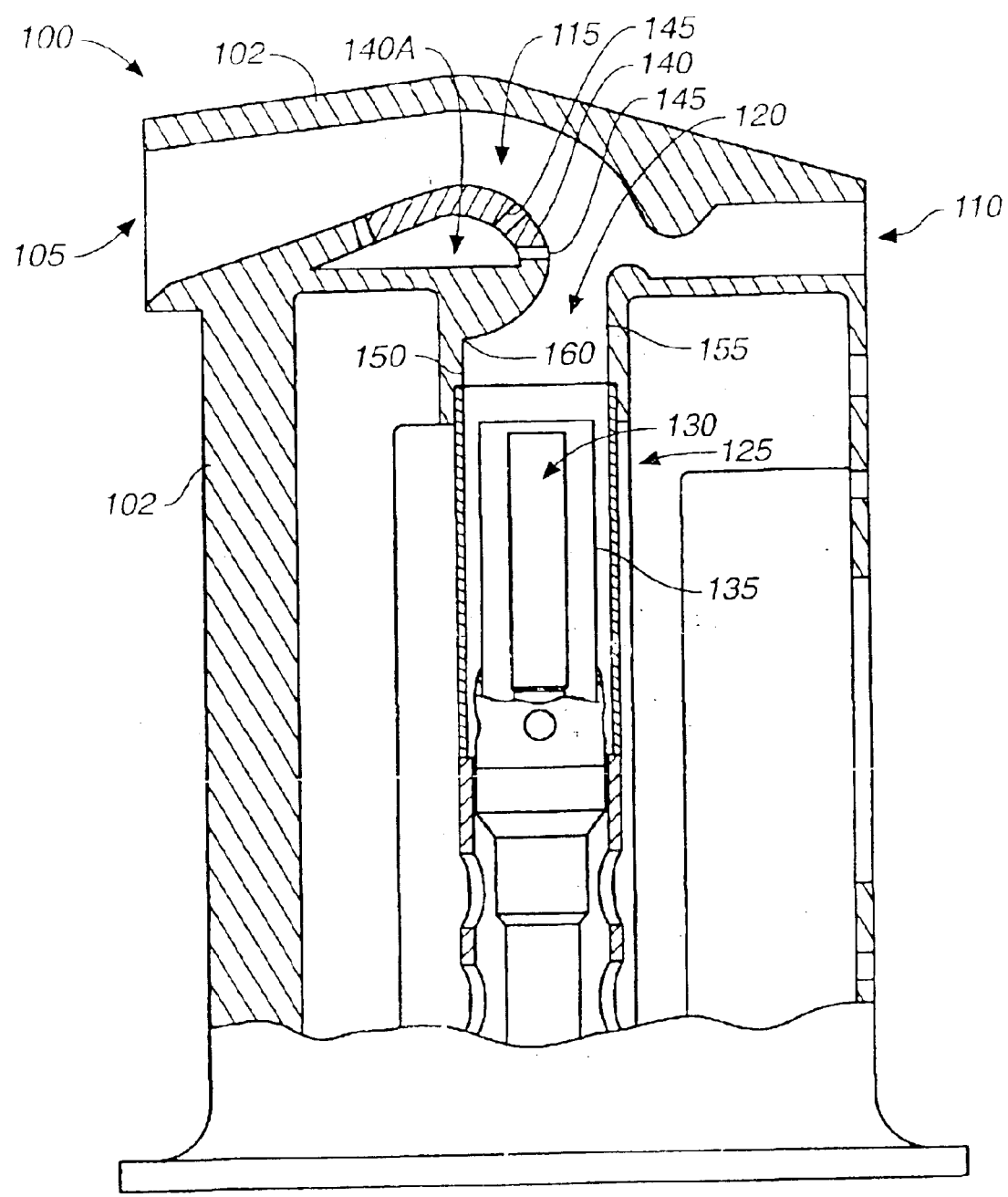
FIG. 1 is a diagrammatic illustration, with portions shown in section, of a prior art total air temperature (TAT) probe.

FIG. 1 is a diagrammatic illustration of a conventional total air temperature (TAT) probe 100, with portions shown in section. TAT probe or sensor 100 includes housing or walls 102 which form a primary inlet or inlet scoop 105 and a main exit channel 110 through which air from the free stream airflow (outside the probe) passes through. Also formed within housing 102 is a flow separation bend 115 which diverts a portion of the airflow between inlet scoop 105 and main exit channel 110 and redirects this portion into TAT sensor flow passage 120. Positioned within sensor flow passage 120 is sensor assembly 125 that includes a sensing element 130 which senses the TAT, and a radiation shield 135 positioned annularly around sensing element 130.

Flow separation bend 115 includes an inner elbow wall 140 which serves to redirect a portion of the airflow into sensor flow passage 120. Contained within inner elbow wall 140 are bleed holes or ports 145, which are maintained at a pressure differential occurring between the inner passage and an external air passage 140A, to remove a portion of the airflow adjacent to the inner elbow wall 140 and to control the heated boundary layer of air to reduce deicing heater error (DHE). TAT sensor flow passage 120 includes a forward wall (relative to redirected airflow in the sensor passage) 150, and an aft wall 155. Forward wall 150 has an upper end at point 160 at which the arc of inner elbow wall 140 ends.

Figure 2:
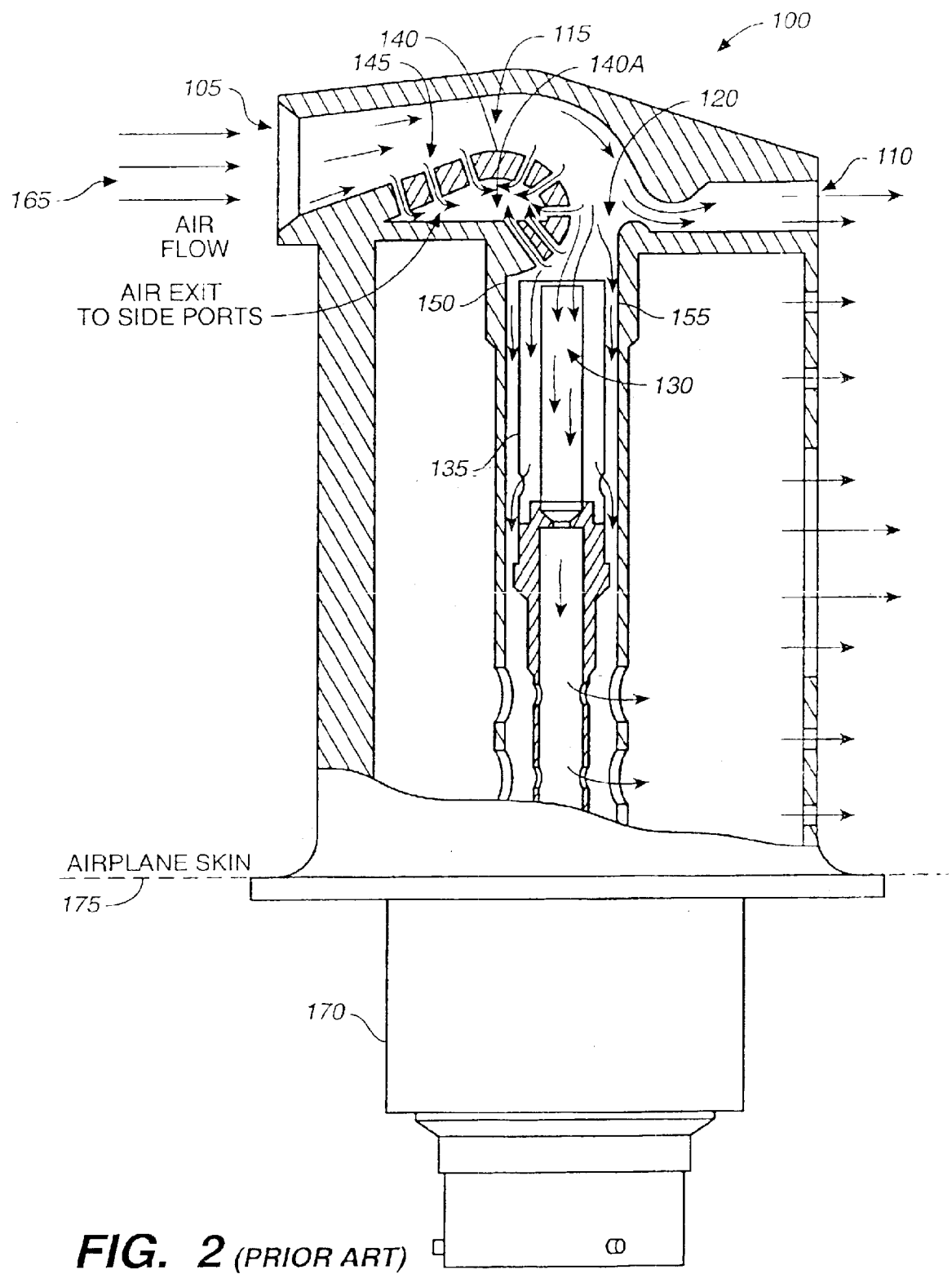
FIG. 2 is a diagrammatic illustration of the prior art TAT probe shown in FIG. 1, which illustrates flow of air through the TAT probe.

FIG. 2 is a diagrammatic illustration of prior art TAT probe 100 which demonstrates airflow patterns into, through and out of the probe. As can be seen in FIG. 2, free stream airflow enters inlet scoop 105 traveling in a direction, or along an axis, represented by arrows 165. Once inside inlet scoop 105, the airflow is redirected by flow separation bend 115 such that a portion of the airflow enters TAT sensor flow passage 120. The portion of the airflow entering sensor flow passage 120 flows along sensing element 130, between shield 135 and sensing element 130, or between shield 135 and walls 150 and 155 before exiting an output port. The remaining air, which does not enter sensor flow passage 120, leaves TAT probe 100 either through a bleed hole 145 or through main exit channel 110. As discussed in the background section, during flight in icing conditions, water droplets and/or ice crystals are ingested into the area between sensing element 130 and radiation shield 135, thereby occasionally temporarily clogging the sensor and causing an error in the TAT reading.

FIG. 2 also illustrates the location of TAT probe 100 relative to skin 175 of an aircraft. It also illustrates electronics housing 170 which contains electronics or electrical circuits of a type which are known to be used with conventional TAT probes for measuring the TAT. Although not specifically illustrated in other figures, TAT probes of the present invention can include an electronics housing and other common TAT probe features.

Figure 3B:
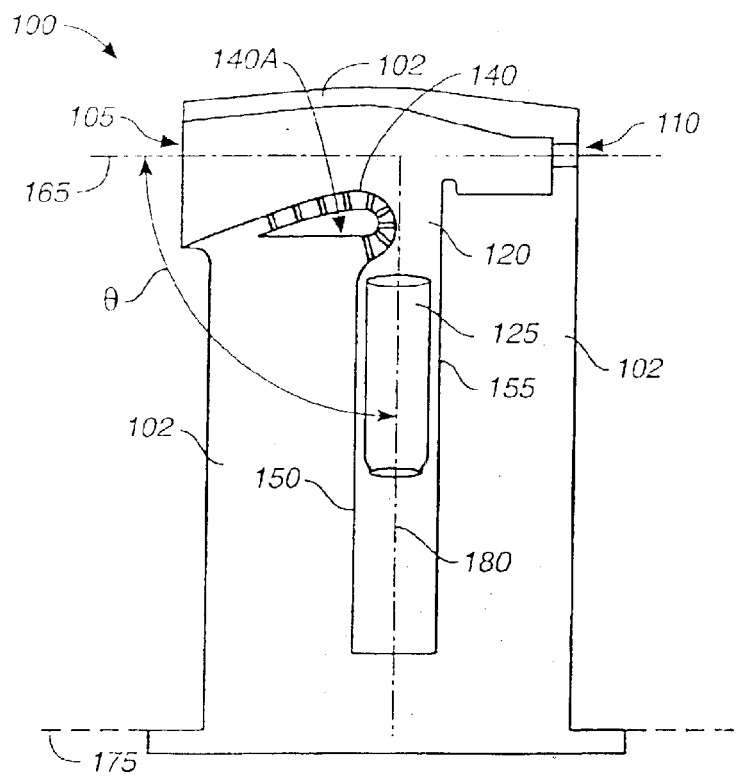
Figure 3B:
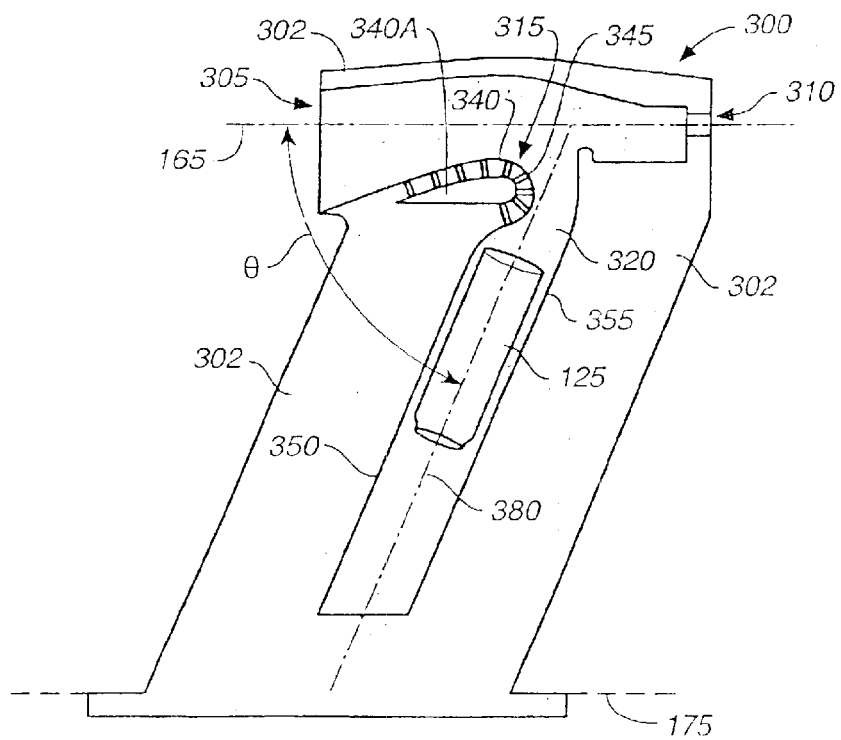

FIGS. 3A and 3B are illustrations of prior art TAT probe 100 and TAT probe 300 of the present invention, respectively. FIG. 3A illustrates orientation of sensor flow passage 120 relative to axis or direction 165 of travel of the free stream airflow prior to entering primary inlet or inlet scoop 105. As shown in FIG. 3A, in prior art TAT probe 100, sensor flow passage 120 is oriented generally along a longitudinal axis 180. In the prior art, axis 180 of sensor flow passage 120 is oriented relative to axis or direction 165 of free stream airflow entering inlet 105 such that it forms an angle θ of approximately 90 degrees.

FIG. 3B is a diagrammatic illustration of a TAT probe 300 in accordance with embodiments of the present invention. Although TAT probe 300 has structural differences relative to TAT probe 100 which provide enhanced anti-icing performance and reduced DHE, it has components which are similar to those of TAT probe 100. TAT probe 300 includes housing 302 forming a flow passage between primary inlet or inlet scoop 305 and main exit channel 310. Also formed in housing 302 is TAT sensor flow passage 320, which receives a portion of the airflow entering the probe at inlet scoop 305. Sensor flow passage 320 is formed between forward wall 350 and aft wall 355. A sensor assembly 125 (having a sensing element 130 and a radiation shield 135 as discussed above) is provided and can be substantially the same as in TAT probe 100. Flow separation bend 315 formed with inner elbow wall 340 acts to divert a portion of the airflow and to provide this portion of the airflow into sensor flow passage 320 for the TAT measurement. Inner elbow wall 340 also includes bleed holes or ports 345 to external air passage 340A to maintain a differential pressure which removes a portion of the airflow and prevents spillage of the heated boundary layer.

In TAT probe 300, sensor flow passage 320 is formed generally along a longitudinal axis 380. As can be seen in FIG. 3B, axis 380 forms an angle θ with axis 165 representing the direction of travel of the free stream airflow just prior to entering the probe primary inlet 305. While this angle in prior art TAT probe 100 is approximately 90 degrees, in TAT probe 300 of the present invention, angle θ is substantially less than 90 degrees. For example, an angle of 45 degrees has been shown in simulations to reduce the total water mass impacting the sensor area as will be described in greater detail below. Stated another way, an elbow bend of approximately 135 degrees (180 degrees−θ) has been shown to be beneficial. While angles θ of between 35 degrees and 65 degrees are likely to produce significantly improved ice and water extraction and thus, enhanced performance in icing conditions, the present invention should be considered to include other ranges of angle θ. For example, angles θ of between 35 and 60 degrees or between 35 and 55 degrees will provide enhanced performance. Further, angles θ of less than approximately 80 degrees can also be used.

Figure 4A:
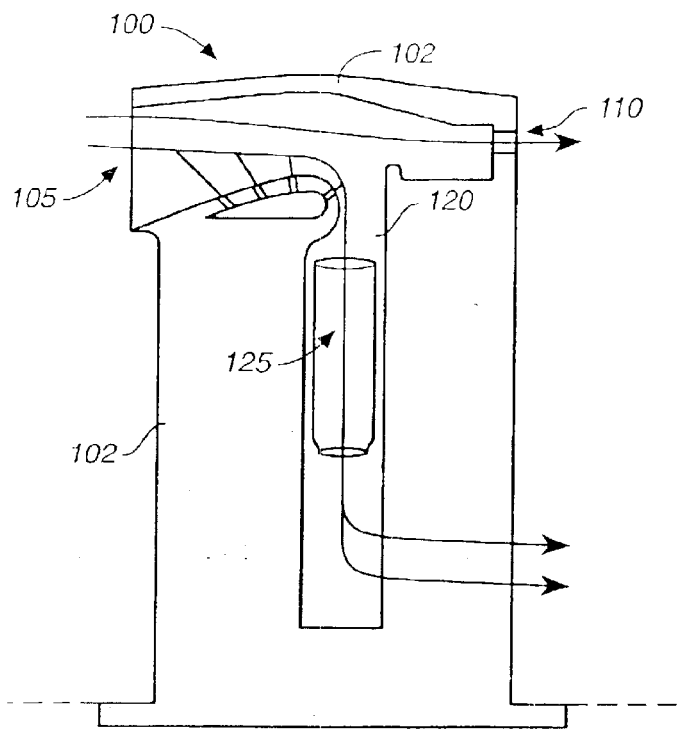
FIGS. 4A and 4B are diagrammatic illustrations of the prior art TAT probe and the TAT probe of the present invention, shown respectively in FIGS. 3A and 3B, which illustrate flow of air through the TAT probes.
Figure 4B:
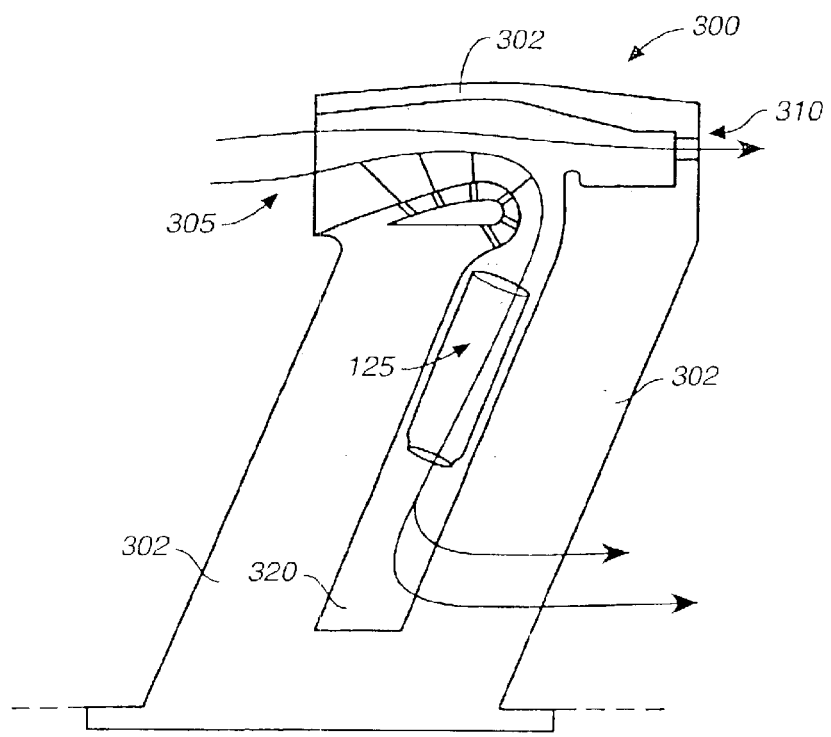

In comparing the conventional TAT probe 100 and TAT probe 300 of the present invention, it can be seen that the elbow angle (180 degrees−θ) is sharper in TAT probe 300, creating a longer arc length of inner elbow wall 340. The sensing element within sensor assembly 125 is also repositioned longitudinally along axis 380 to be more in-line with the airflow path provided by TAT sensor flow passage 320. These two features help to provide significant performance improvements in TAT probe 300. FIGS. 4A and 4B diagrammatically illustrate the airflow in each of TAT probes 100 and 300.

Figure 5A:
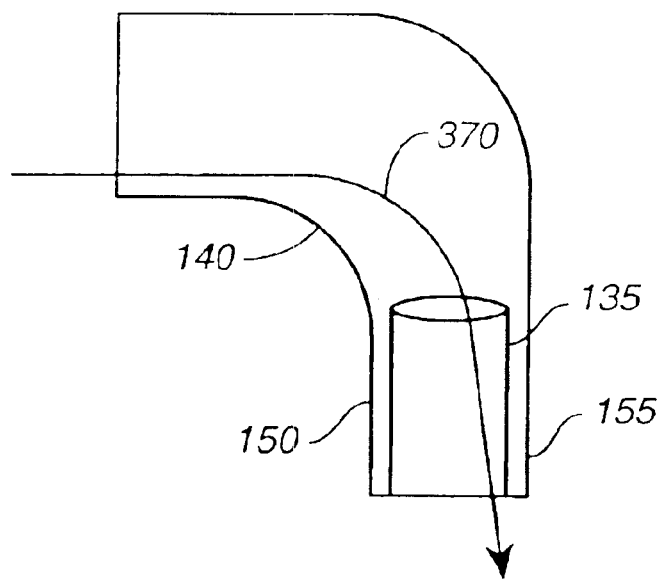
FIGS. 5A and 5B are diagrammatic illustrations of a portion of each of the TAT probes shown in FIGS. 3A and 4A and in FIGS. 3B and 4B, respectively, which illustrates a mechanism of particle capture in the TAT probes of the present invention.
Figure 5B:
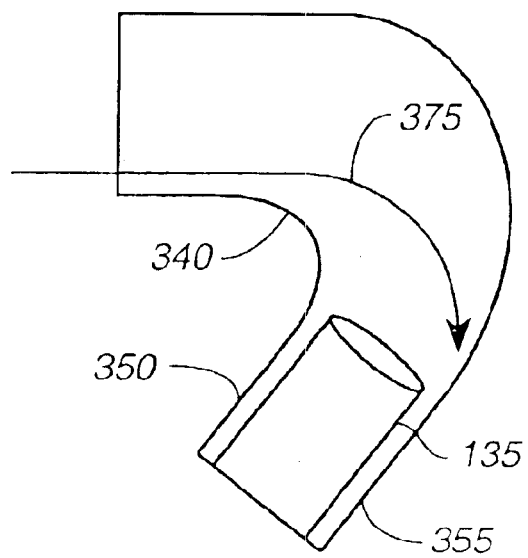

FIGS. 5A and 5B are diagrammatic illustrations representing the inner elbow wall, the forward wall and the aft wall for each of TAT probes 100 and 300, respectively.

Curve 370 in FIG. 5A represents the trajectory of a 2.5 micron diameter particle into sensor flow passage 120 in TAT probe 100. Curve 375 in FIG. 5B represents the trajectory of a 2.5 micron diameter particle into sensor flow passage 320 in TAT probe 300.

As can be seen in FIG. 5A, in the conventional TAT probe configuration, a 2.5 micron diameter particle will more frequently follow trajectory 370, allowing it to easily exit the elbow region without impacting a wall. This increases the chance that the particle will impact, or accrete onto, the sensing element (for example by passing into the interior portion of radiation shield 135) during operation in atmospheric icing conditions.

In contrast, FIG. 5B illustrates a typical path of a 2.5 micron diameter particle in TAT probe 300 of the present invention during one example set of operational conditions. As can be seen in FIG. 5B, the higher degree of elbow bend in TAT probe 300 causes the particle to impinge on the outer elbow wall or an upper portion of wall 355 of sensor flow passage 320. Thus, the particle is less likely to enter the sensing area inside of radiation shield 135, and can therefore be extracted from the flow with reduced likelihood for icing interference with the total air temperature measurement. The benefits offered by the sensor passage configuration and orientation in TAT probe 300 with regard to water droplet extraction have been demonstrated using analytical modeling techniques. Simulations show that the 135 degrees elbow bend ($\theta \approx 45$ degrees) can reduce by up to 40% the total water mass impacting the sensor area. This reduction extends the time to accrete ice by almost a factor of two relative to conventional TAT probe designs during flight operation in moderate to severe liquid water icing conditions.

Figure 6A:
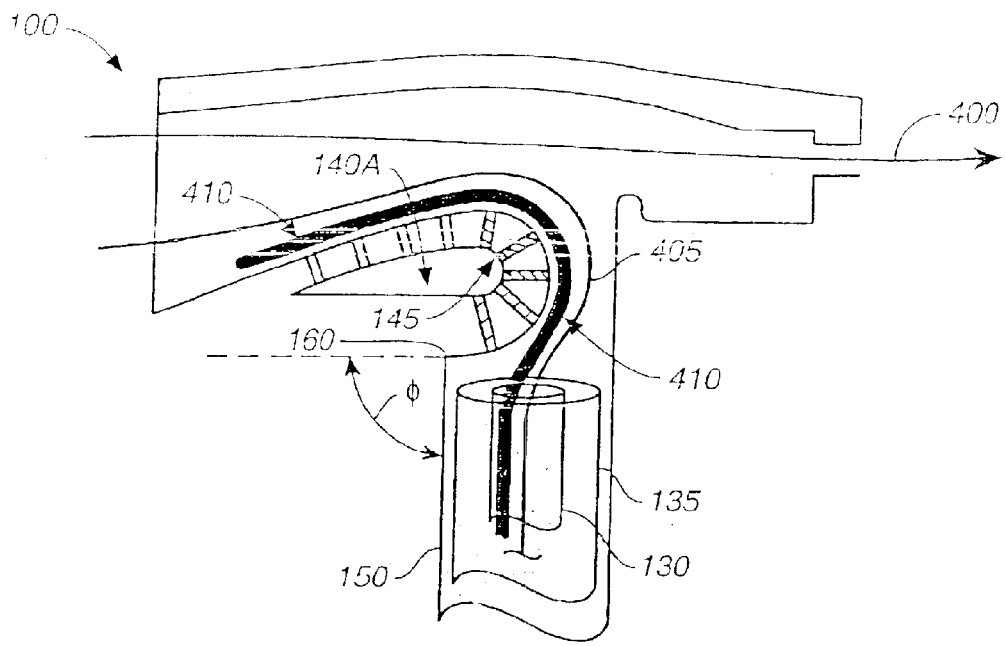
FIGS. 6A and 6B illustrate a prior art TAT probe and a TAT probe of the present invention, respectively, showing improvement in boundary layer spillage control.
Figure 6B:
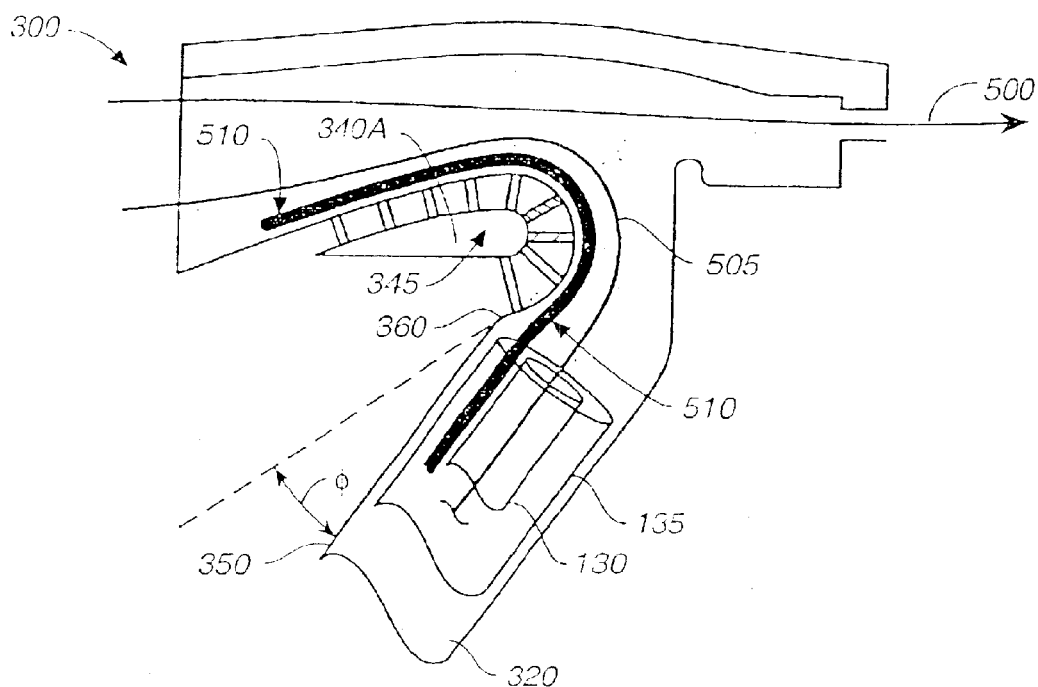

Conventional TAT probe 100 and TAT probe 300 of the present invention can also be compared to illustrate the differences between the two designs with regard to boundary layer spillage. The differences in boundary layer spillage performance are depicted in FIGS. 6A and 6B. As discussed above, the boundary layer of air which separates from the heated elbow surface and enters the sensing element will result in an increased DHE. As shown in FIG. 6A, a portion 400 of the airflow entering the probe also exits through the main exit channel. Another portion 405 of the air entering the TAT probe is redirected by the flow separation bend (i.e., including inner elbow wall 140) into the TAT sensor flow passage where it flows across the sensing element 130. As illustrated in FIG. 6A, this portion 405 of the airflow flows in the inside of radiation shield 135. With inner elbow wall 140 being a heated surface, a boundary layer 410 of air along the inner elbow wall will also be heated.

As illustrated in FIG. 6A, the configuration of TAT probe 100 is such that a number of bleed holes 145 become stagnant (as indicated by cross-hatching). This is due to the fact that, under certain situations, the differential pressure across the bleed holes can drop to zero due to the higher flow velocity along the elbow's inner radius. This stagnation of flow through the bleed holes creates a loss in boundary layer control. The resulting perturbation, if large enough, can cause the boundary layer 410 to separate from the inner surface and make contact with the sensing element as shown in FIG. 6A. Because the housing walls are heated, so is the boundary layer, and hence any contamination of the main airflow by the heated boundary layer will result in a corresponding error in the TAT measurement. In general, it is difficult to prevent the stagnation of some of the bleed holes. However, as will be discussed with reference to FIG. 6B, the sensing element in the present invention can be favorably repositioned in the sensor flow passage 320 to help reduce the impact of boundary layer spillage.

Referring to FIG. 6B, TAT probe 300 of the present invention is shown with sensor flow passage 320 angled relative to the direction of incoming airflow (just prior to entering the inlet scoop) as was discussed above. As was the case with TAT probe 100 shown in FIG. 6A, a portion 500 of the airflow entering the probe exits through main exit channel 110, while another portion 505 is redirected by the flow separation bend such that it enters the area of sensor 130 within sensor flow passage 320. Also like TAT sensor 100, the heated surface of the inner elbow wall results in a boundary layer 510 having a temperature which can adversely affect the total air temperature measurement. Bleed ports 345 are again used to control boundary layer 510. The TAT probe configuration of the present invention helps to reduce the number of stagnant bleed ports to reduce boundary layer spillage, and to position sensor assembly 125 (i.e., sensing element 130 and radiation shield 135) such that the effect of boundary layer spillage is lowered.

As can be seen in FIG. 6A, in TAT probe 100 inner elbow wall 140 ends at point 160 at which it meets forward wall 150. The tangent to inner elbow wall 140 at point 160 forms an angle $\phi$, relative to forward wall 150, of approximately 90 degrees. This sharp angle enables flow re-circulation and can result in boundary layer spillage possibly entering the sensor area and causing DHE.

Referring now to FIG. 6B, in the present invention, point 360 is where the inner elbow wall 340 meets forward wall 350 of sensor flow passage 320. At point 360, the arc or curved surface of the inner elbow wall has a tangent which forms a much smaller angle $\phi$ with wall 350. Reduction of angle $\phi$ reduces flow re-circulation and boundary layer spillage. Because the sensing element axis in the TAT probe 300 configuration is aligned with the flow, any flow separation that does occur will be less likely to enter the sensor when compared to the standard configuration shown in FIG. 6A. Furthermore, the configuration of the present invention shown in FIG. 6B eliminates a region of separation and re-circulation located at the base of the elbow (i.e., at point 360), thus encouraging a more uniform flow over the sensing element.

FIG. 7 is a diagrammatic perspective view of a portion of an aircraft 700 on which TAT probe 300 of the present invention is mounted. As shown in FIG. 7, aircraft 700 includes a fuselage 705 and an aircraft engine 710. While TAT probe 300 of the present invention can be positioned or mounted on other surfaces of aircraft 700, in this particular embodiment, instead of being mounted to the skin of fuselage 705, TAT probe 300 is mounted on surface 715 of engine 710. Surface 715 forms part of the inlet portion of engine 710, upstream of fan blades 720. However, other aircraft engine surfaces can also be used. Of course, the present invention is not limited to TAT probes mounted to surfaces of aircraft engines, but instead applies more generally to TAT probes mounted to any aircraft surfaces for purposes of measuring TAT. Still more generally, the present invention applies to TAT probes having features as described above with reference to FIGS. 1–6B, regardless of the surface they are to be mounted to.

Although the present invention has been described with reference to preferred embodiments, workers skilled in the art will recognize that changes may be made in form and detail without departing from the spirit and scope of the invention.

What is claimed is:

1. A total air temperature probe for measuring total air temperature, the probe comprising:

an inlet scoop which receives airflow from free stream airflow, the free stream airflow moving toward the inlet scoop from a first direction;

a main exit channel through which a first portion of the airflow entering the inlet scoop exits from the probe;

a TAT sensor flow passage extending longitudinally along an axis, the axis being oriented to form an angle $\theta$ with the first direction from which the free stream airflow moves toward the inlet scoop, the angle $\theta$ being between about 35 degrees and about 65 degrees; and a sensor assembly extending longitudinally in the sensor flow passage and configured to measure a total air temperature of airflow through the sensor flow passage.

2. The probe of claim 1, wherein the angle $\theta$ is between about 35 degrees and 55 degrees.

3. The probe of claim 1, wherein the probe is mounted on an aircraft surface.

4. The probe of claim 3, wherein the aircraft surface is an aircraft engine surface.

5. The probe of claim 1, and further comprising a flow separation bend positioned between the inlet scoop and the main exit channel, the flow separation bend diverting a second portion of the airflow entering the inlet scoop into the TAT sensor flow passage.

6. The probe of claim 5, wherein the flow separation bend includes a heated inner elbow wall forming a curved surface between the inlet scoop and a first wall of the sensor flow passage, the inner elbow wall having a plurality of bleed holes vented to an external air passage such that a pressure differential exists, enabling control of a boundary layer of air adjacent to the inner elbow wall.

7. The probe of claim 6, wherein the curved surface of the inner elbow wall ends at a point of intersection between the inner elbow wall and the first wall of the sensor flow passage.

8. The probe of claim 7, wherein a tangent to the curved surface of the inner elbow wall at the point of intersection forms an angle $\phi$, with the first wall of the sensor flow passage, of less than 90 degrees.

9. A total air temperature probe for measuring total air temperature, the probe comprising:

an inlet scoop which receives airflow from free stream airflow, the free stream airflow moving toward the inlet scoop from a first direction;

a main exit channel through which a first portion of the airflow entering the inlet scoop exits from the probe;

a TAT sensor flow passage having first and second walls and extending longitudinally along an axis, wherein the axis is oriented such that it forms an angle $\theta$ with the first direction from which the free stream airflow moves toward the inlet scoop, the angle $\theta$ being between about 35 degrees and about 65 degrees;

a sensor assembly extending longitudinally in the sensor flow passage and configured to measure a total air temperature of airflow through the sensor flow passage; and a flow separation bend positioned between the inlet scoop and the main exit channel, the flow separation bend including a heated inner elbow wall forming a curved surface which ends at a point of intersection between the inner elbow wall and the first wall of the sensor flow passage, wherein a tangent to the curved surface of the inner elbow wall forms an angle $\phi$, with the first wall of the sensor flow passage, of less than 90 degrees.

10. The probe of claim 9, wherein the angle $\theta$ is between about 35 degrees and about 60 degrees.

11. The probe of claim 9, wherein the probe is mounted on an aircraft surface.

12. The probe of claim 11, wherein the aircraft surface is an aircraft engine surface.

* * * * *